June 29, 1954   G. A. MONTOOTH   2,682,406
BALL LIFTING APPARATUS FOR BOWLING ALLEYS
Filed Jan. 6, 1950   8 Sheets-Sheet 1
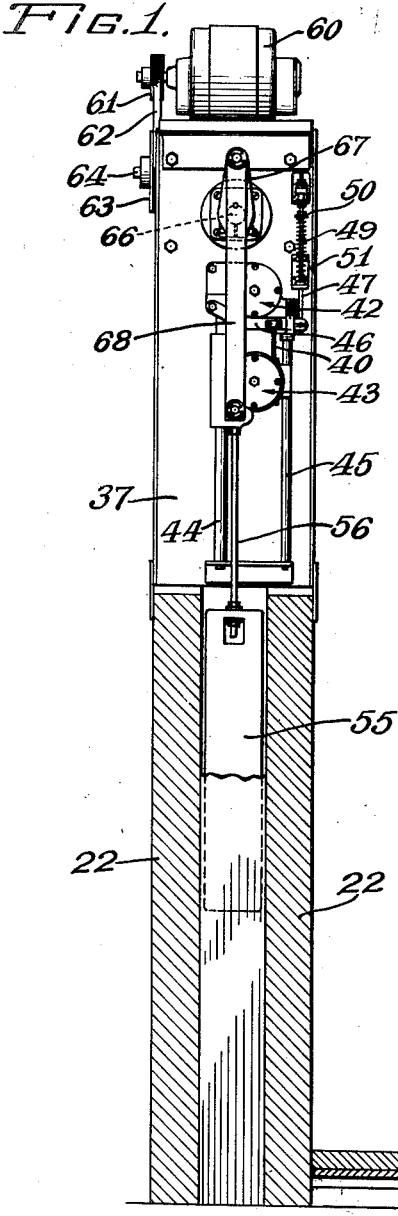
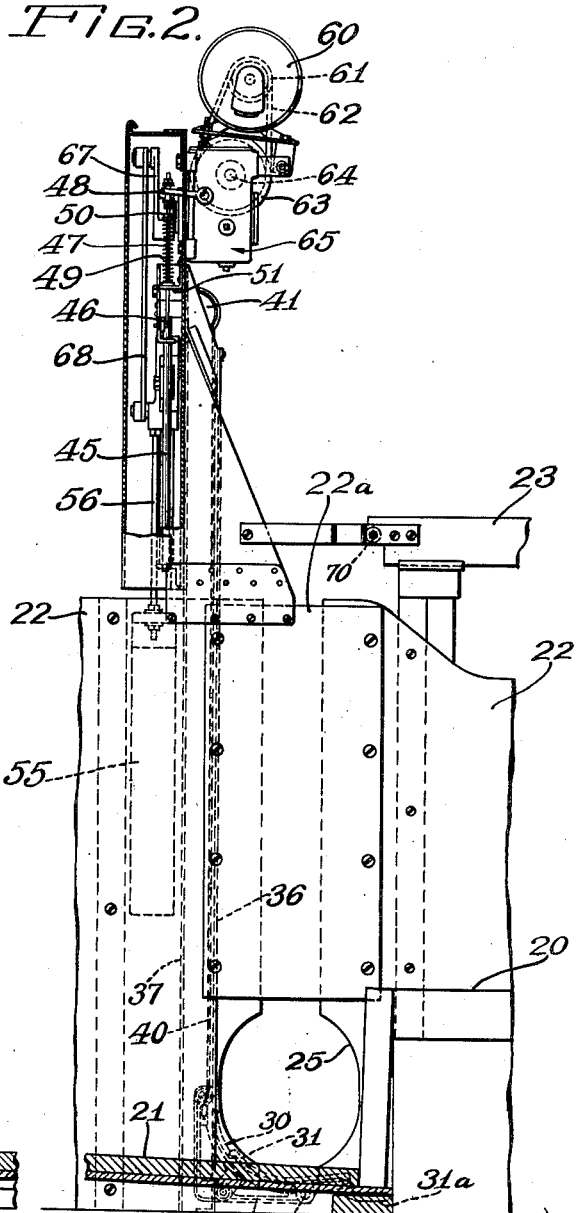
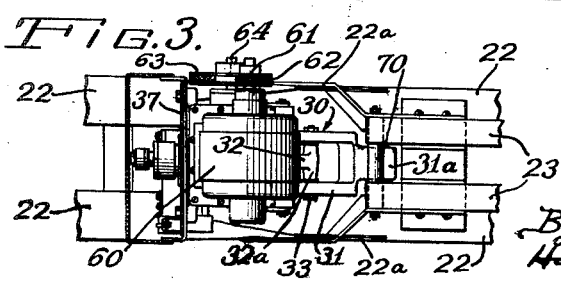
Inventor:
George A. Montooth
By Schroeder, Merriam,
Hofgren & Brady
Attys.

June 29, 1954  G. A. MONTOOTH  2,682,406
BALL LIFTING APPARATUS FOR BOWLING ALLEYS
Filed Jan. 6, 1950  8 Sheets-Sheet 2
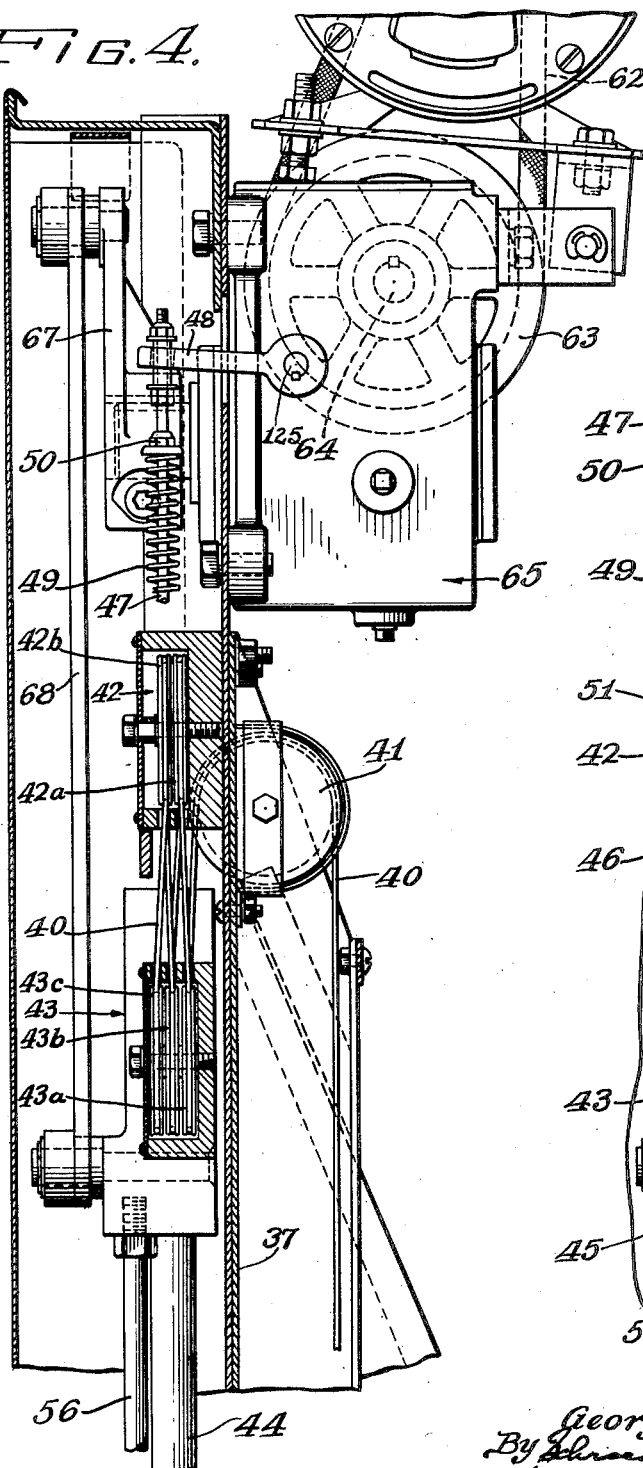
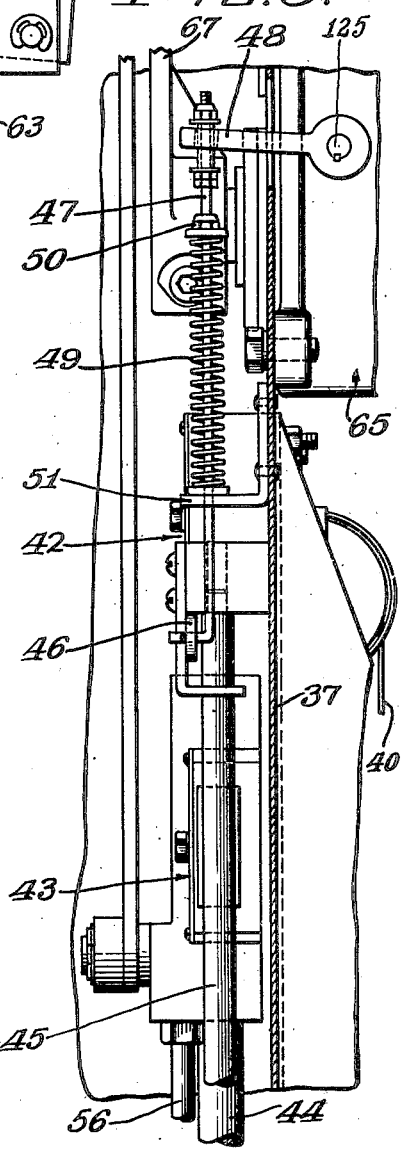
Inventor:
George A. Montooth
By Schroeder, Merriam,
Hofgren & Brady, Attys.

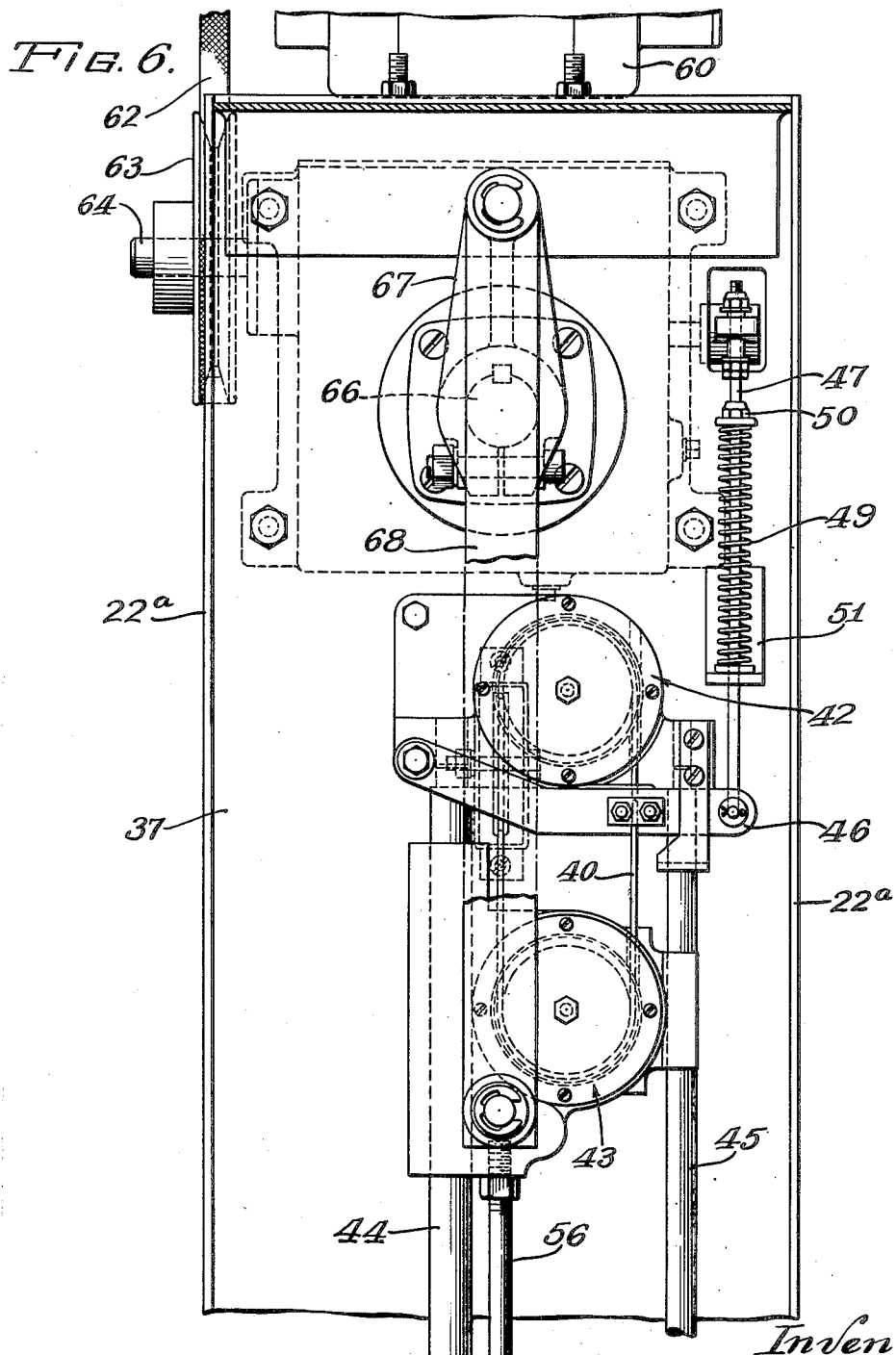

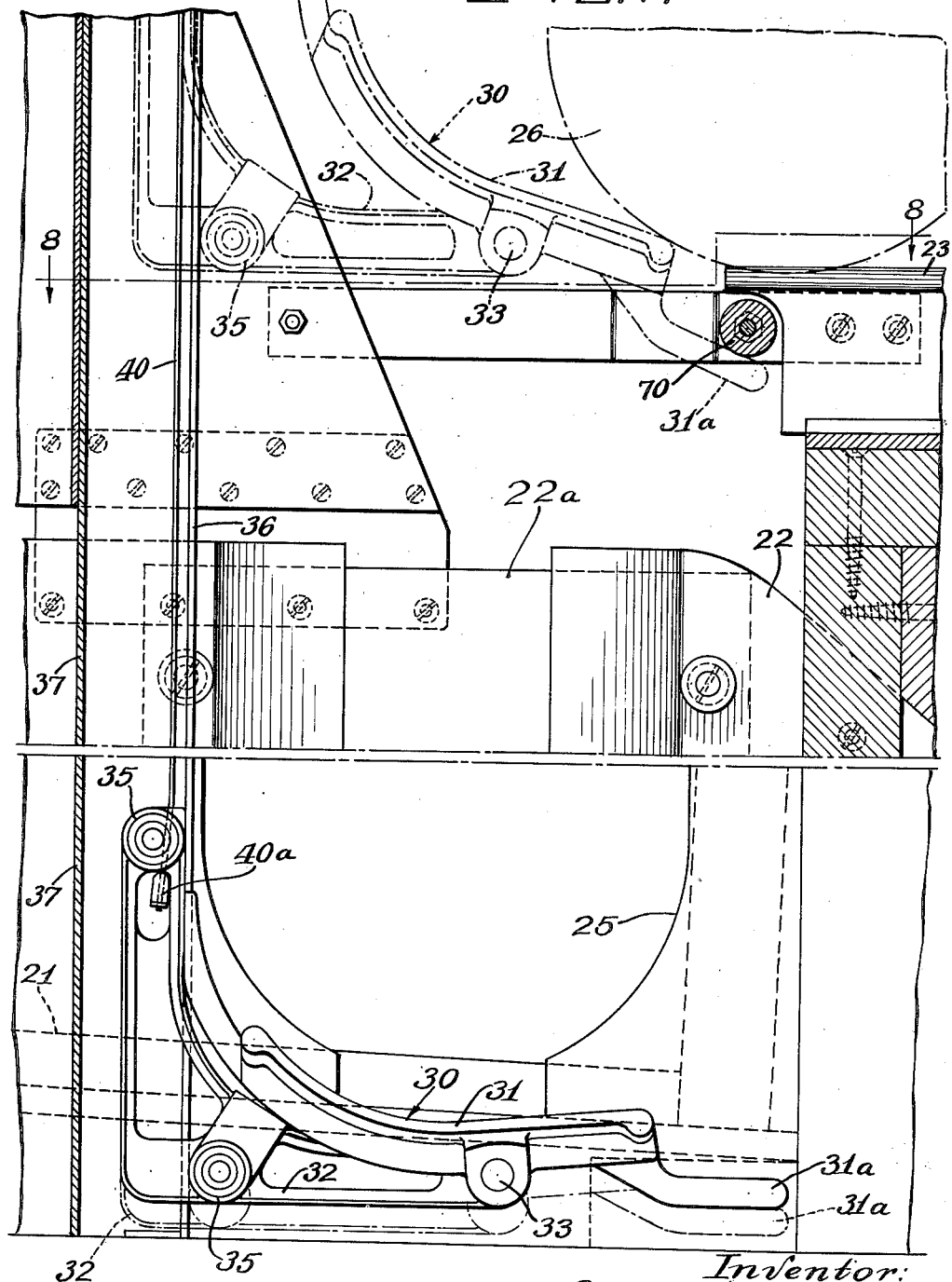

June 29, 1954  G. A. MONTOOTH  2,682,406
BALL LIFTING APPARATUS FOR BOWLING ALLEYS
Filed Jan. 6, 1950  8 Sheets-Sheet 5
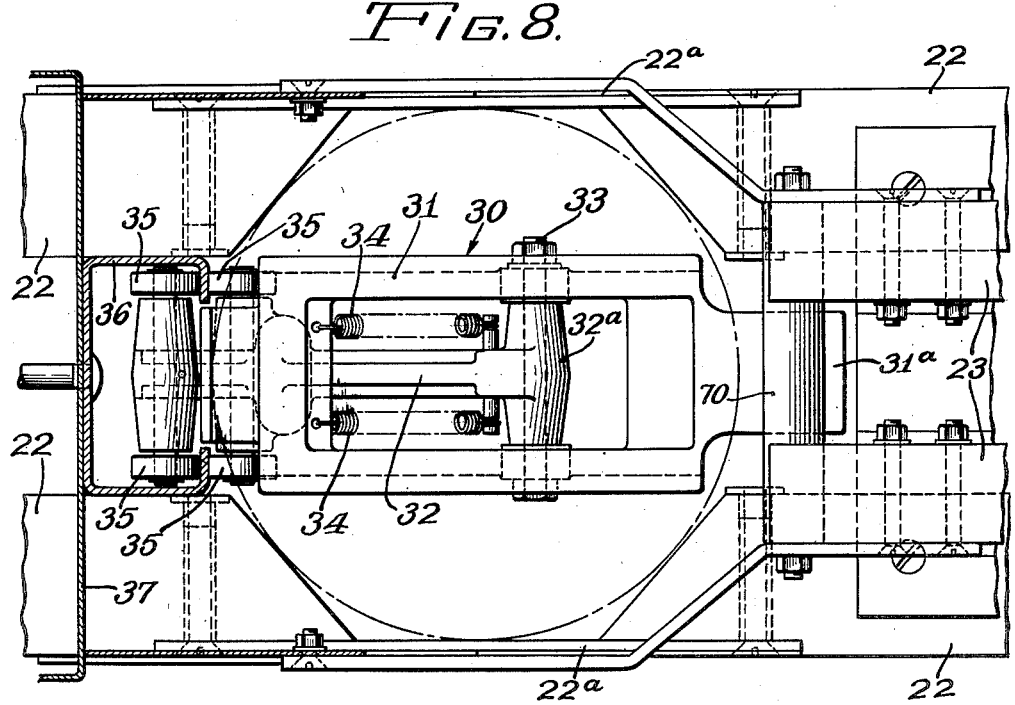
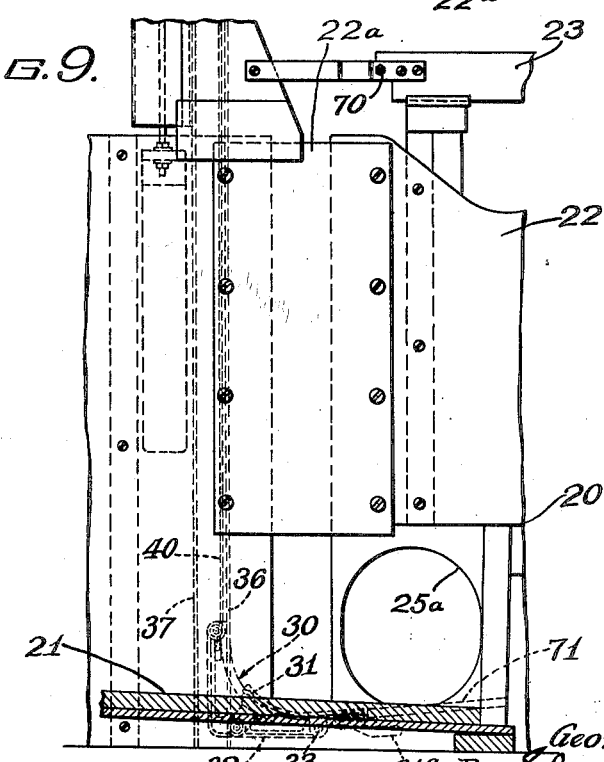
Inventor:
George A. Montooth

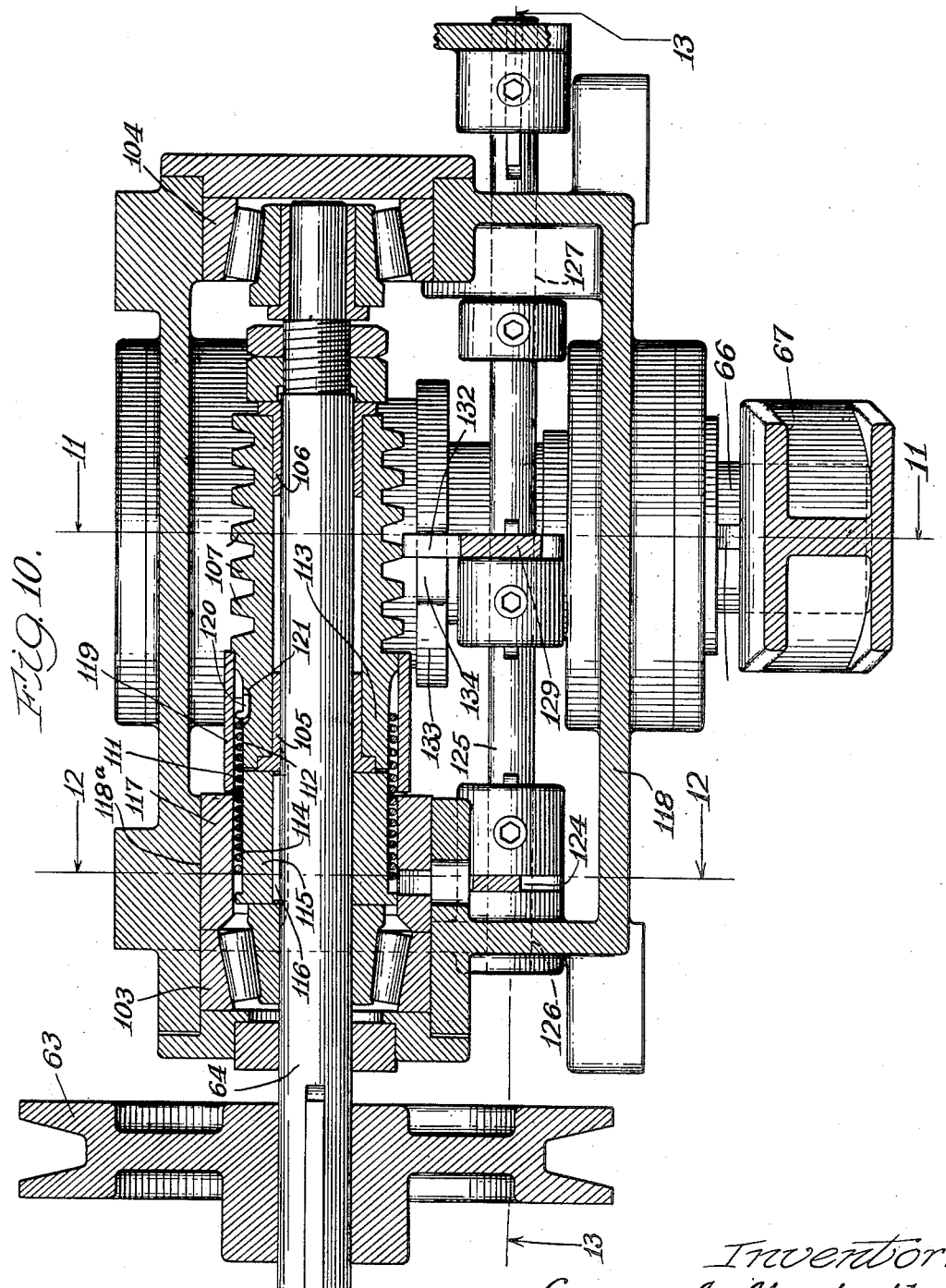

June 29, 1954  G. A. MONTOOTH  2,682,406
BALL LIFTING APPARATUS FOR BOWLING ALLEYS
Filed Jan. 6, 1950  8 Sheets-Sheet 7
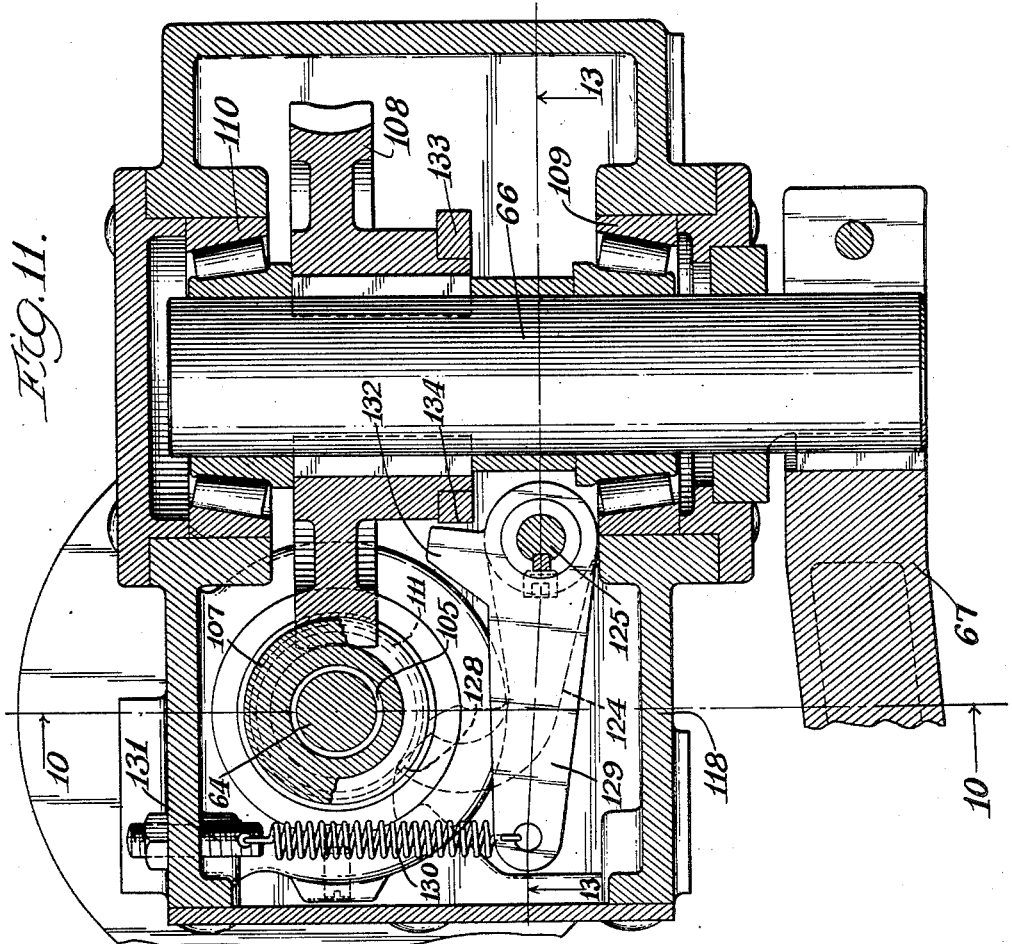
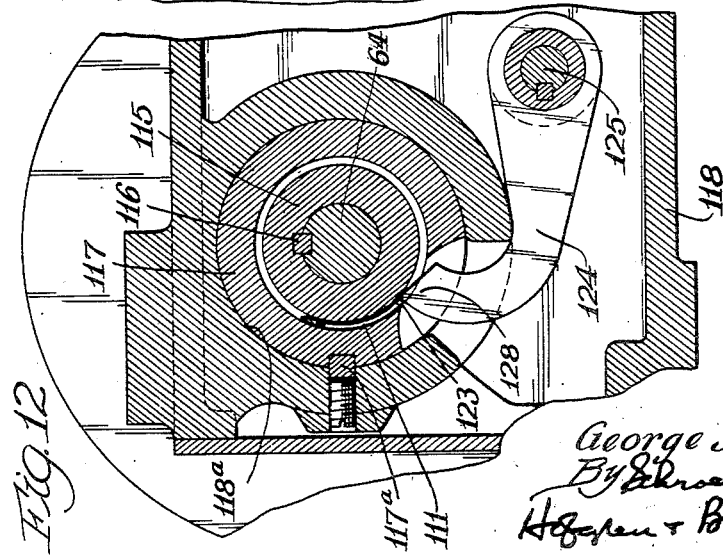
Inventor:
George A. Montooth

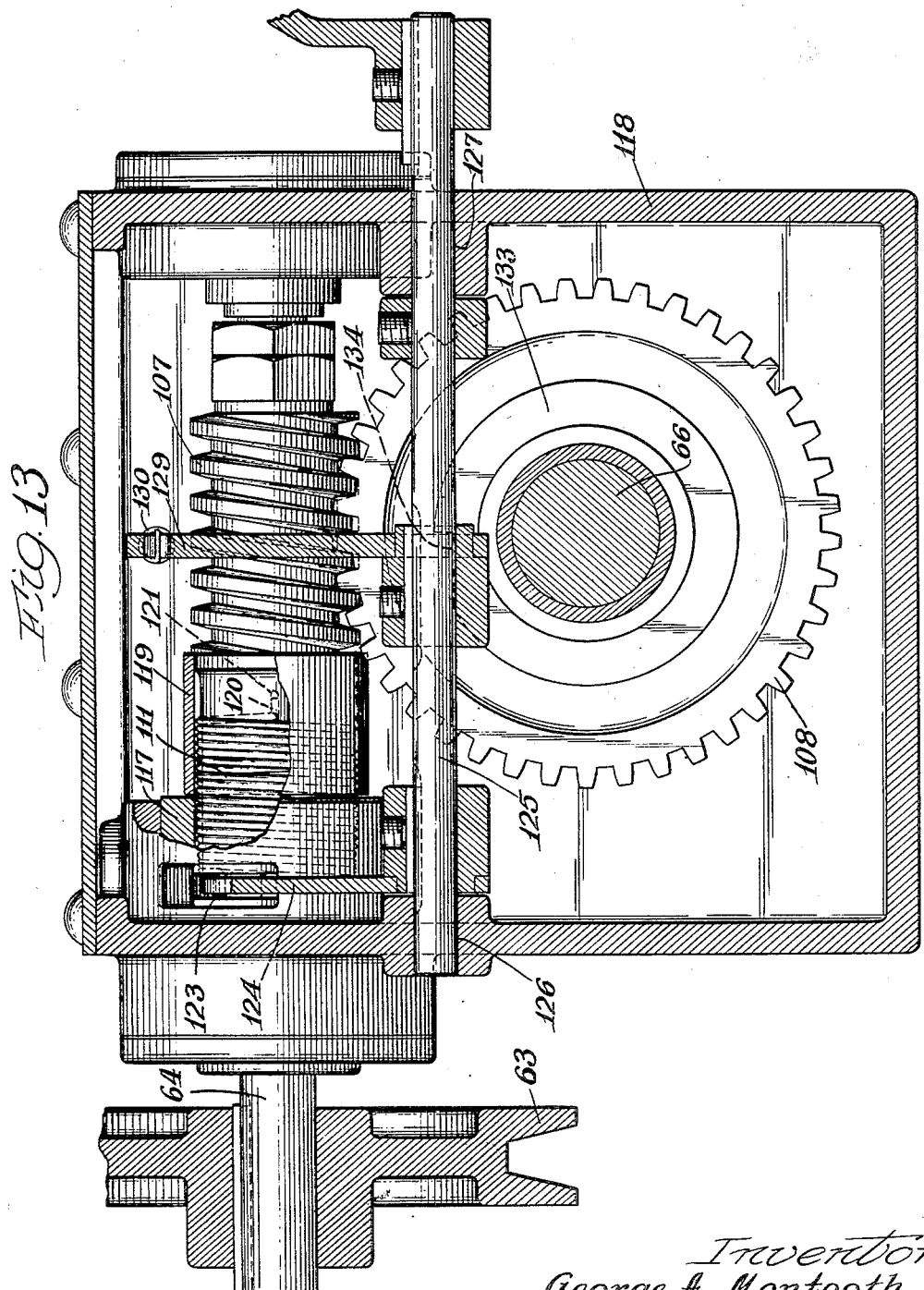

Patented June 29, 1954

2,682,406

UNITED STATES PATENT OFFICE 2,682,406

BALL LIFTING APPARATUS FOR BOWLING ALLEYS

George A. Montooth, Long Beach, Calif., assignor to The Brunswick-Balke-Collender Company, a corporation of Delaware Application January 6, 1950, Serial No. 137,178

4 Claims. (Cl. 273—49)

This invention relates to a ball lifting apparatus for bowling alleys, and more particularly to improved apparatus for lifting a bowling ball from adjacent the pit floor of a bowling alley to an elevated ball-return track.

The general object of the invention is to provide an improved mechanism for lifting a bowling ball from adjacent the pit of a bowling alley to an elevated ball-return track.

Another object of the invention is to provide a ball carrying device having a flexible cable connected directly thereto for supporting the device, and means connected to the cable for moving the device from a rest position through a cycle to lift the ball from adjacent the pit floor to the return track, this last means including motion multiplying means.

Another object of the invention is to provide apparatus wherein the ball-carrying device normally rests adjacent the floor of the pit in ball-receiving position so that the ball may be returned in a minimum of time during the first portion of the cycle of the apparatus.

Another object of the invention is to provide ball-lifting apparatus having a novel ball-carrying device which is tiltable to discharge the ball onto the return track.

Other objects and advantages of the invention will be apparent from the description taken in connection with the accompanying drawings, in which:

Fig. 1 is a rear elevational view, partly broken away, of the improved ball-lifting apparatus;

Fig. 2 is a fragmentary longitudinal vertical section through the pit of a bowling alley showing the apparatus of Fig. 1 in side elevation;

Fig. 3 is a plan view of the apparatus;

Fig. 4 is an enlarged fragmentary vertical section through the upper portion of the apparatus of Fig. 2;

Fig. 5 is a fragmentary vertical section similar to a portion of Fig. 4;

Fig. 6 is an enlarged fragmentary vertical section taken at right angles to Fig. 4;

Fig. 7 is an enlarged fragmentary section showing the ball-carrying device in solid lines in ball-receiving position and in broken lines in ball supporting and ball-discharge positions;

Fig. 8 is a horizontal section along the line 8—8 of Fig. 7;

Fig. 9 is a fragmentary longitudinal vertical section through the pit of a bowling alley showing a modified arrangement;

Fig. 10 is a vertical section through the gear box mechanism, the section being taken along the line 10—10 of Fig. 11;

Fig. 11 is a vertical section along the line 11—11 of Fig. 10;

Fig. 12 is a vertical section along the line 12—12 of Fig. 10; and

Fig. 13 is a vertical section along the line 13—13 of Figs. 10 and 11.

While my invention is susceptible of embodiment in many different forms, I have shown in the drawings and will herein describe in detail two specific embodiments with the understanding that the present disclosure is to be considered as an exemplification of principles of the invention and is not intended to limit the invention to the embodiments illustrated. The scope of the invention will be pointed out in the appended claims.

The game of bowling is played upon a smooth ball rollway, at the end of which bowling pins are placed in upright position in a prescribed pattern. The player rolls a ball down the rollway with the object of striking the pins to propel both the pins and ball off the end of the rollway into a pit, from which a pinboy usually lifts the ball and places it on an elevated portion of a ball-return track which conveys the ball by gravity back to the player.

One pinboy will generally service two adjacent bowling alleys and there is generally one common ball-return track disposed between these alleys. The pit floor is generally sloped forwardly (toward the player's end of the alley) so that the bowling ball and pins will bounce against the kickbacks and the pit cushion and will fall to the pit floor where they will roll to the front of the pit where the pinboy may reach them quickly. This invention provides improved mechanical means for lifting the ball and placing it on the return track for return to the bowler.

Referring now to the drawings, at the rear of a bowling alley rollway 20 is a pit having a forwardly sloping floor 21 below the level of the ball rollway. Wooden kickbacks 22 at either side of the pit and a pit cushion (not shown) at the rear of the pit are provided to keep the ball and pins within the confines of the pit. A ball-return track 23 is provided between each adjacent pair of bowling alleys and during a game of bowling a "used" bowling ball (which means a ball which enters the pit after it has been rolled) is placed on the rear elevated portion of the return track where it rolls by gravity over the track to the player's end of the bowling alley. The front portion of each kickback is extended upwardly above the normal level of the kickbacks and the necessary apparatus for setting the pins (not shown) is generally mounted between the kickbacks on the elevated portions thereof. It will be noted that the floor 21 of the pit is generally sloped forwardly toward the bowling alley rollway 20 so that the pins and bowling ball will naturally roll toward the front of the pit where the pinboy may easily reach them to reset the pins and push the ball into the ball lifting apparatus.

One side wall or kickback is partially cut away and the cut away portion is replaced by a thin plate 22a under which an opening 25 is provided, this opening being of a size sufficiently large to admit a bowling ball (designated at 26 in Fig. 7) therethrough; and the adjacent kickbacks of two adjacent bowling alleys are each similarly altered and provided with such an opening 25 similarly placed in alignment. A ball-carrying device designated generally at 30 is in the space between the kickbacks of the adjacent alleys, this device being in alignment with the openings 25 in Figs. 1–8.

The device 30 comprises a ball-holding or shoe portion 31 having a forwardly extending tongue 31a, and a chassis portion 32. The chassis has an arm extending longitudinally between spaced side members of the ball holding portion and a head 32a on the arm provides a mounting for the ball-holding portion, this portion being pivotal about the axis of a bolt 33. Springs 34 are connected between the two portions normally to maintain the ball-holding portion 31 level as shown in Fig. 2 and in the lower part of Fig. 7.

The ball-carrying device 30 is movable in a vertical path between the side walls of adjacent pits, rollers 35 on the chassis 32 engaging a vertical trackway formed by an upstanding channel member 36 which is bolted to an upstanding backing plate 37 which forms part of the frame of the ball-lifting apparatus.

A flexible cable 40 has one end attached to the chassis 32 at 40a (see Fig. 7), the cable passing over a pulley 41 mounted in an opening in the backing plate 37. The apparatus for moving the ball-carrying device is disclosed and claimed in combination with other mechanism in the copending application of Robert I. Anderson et al. for "Ball Lifting Apparatus for Bowling Alleys," filed October 5, 1949, as Ser. No. 119,715. On the rear side of the backing plate a sheave 42 is fixedly mounted and includes two independently rotatable pulleys 42a and 42b. Another sheave 43, including three independently rotatable pulleys 43a, 43b and 43c, is slidably mounted on a rod 44, a bar 45 holding the sheave 43 against rotation and in a plane parallel to the backing plate 37. After passing over the pulley 41 the cable 40 passes in succession over pulleys 43a, 42a, 43b, 42b and 43c in the respective sheaves 42 and 43 as shown in Fig. 4. The end of the cable is affixed to a lever arm 46 which is pivoted at one end on the housing for the sheave 42 and is pivotally secured at the other end to a rod 47 mounted on a trip arm 48. A spring 49 is compressed between a collar 50 on the rod 47 and a bracket 51 extending from the backing plate 37 and normally forces the rod 47 upwardly. In the event the cable is pulled by a force sufficient to overcome the spring 49 the free end of the trip lever 48 will be pulled downwardly.

A counterweight 55 is slidable in ways formed on the backing plate 37, and the counterweight is connected with the sheave 43 by means of a rod 56.

A continuously operable motor 60 drives a pulley 61 which is connected by a belt 62 to a pulley 63 on the input shaft 64 of a gear box designated generally at 65 and described in detail hereafter. The output shaft 66 of the gear box carries a crank 67 pivotally connected at its free end to one end of a connecting rod 68, the other end of the connecting rod being pivotally connected to the slidable sheave 43. The gear box is actuated by a pull on the trip lever 48, and is arranged to rotate the crank 67 through one complete revolution and then to stop.

In the operation of the device the ball carrier 30 is normally in lower rest position adjacent the floor 21 of the pit as shown in solid lines in the lower portion of Fig. 7. After a bowling ball has been rolled and enters the pit the pinboy pushes the ball through the opening 25 onto the ball carrier 30. The weight of the ball moves the ball-carrier 30 down to the broken line position shown in the lower part of Fig. 7, and this exerts a pull on the cable 40 to overcome the force of spring 49 and move the trip arm 48 downwardly (a partial counterclockwise rotation). The arm 48 triggers the gear box mechanism which rotates the crank 67 through one complete revolution each time the triggering action occurs. Through the first 180° of rotational movement of the crank 67 the sheave 43 will be moved away from the sheave 42, and the ball-carrying device 30 will be raised. The sheave arrangement illustrated permits a 6:1 motion multiplication, the ball carrier rising about 42" while the sheave 43 moves downwardly only about 7". When the ball carrier 30 has reached the level of the return track as shown in broken lines in the upper portion of Fig. 7, the tongue 31a on the ball-holding portion engages a stop collar 70 mounted between the rails of the return track 23. Since the chassis 32 of the carrier 30 is still rising, the ball holding shoe 31 pivots about the bolt 33 as shown in Fig. 7, discharging the ball 26 onto the return track which conveys the ball back to the player's end of the alley. The broken line position of Fig. 7 is the position of the parts when the crank 67 has completed 180° of rotational movement, and during the second 180° of rotation the ball carrier is returned to its rest position adjacent the pit floor.

The improved ball-lifting mechanism is advantageous in that the ball is raised to the return track during the first portion of the operating cycle, thereby minimizing as much as possible any delay in the return of the ball to the player's end of the alley.

Fig. 9 illustrates a modification which is advantageous over the first form described in two respects. As shown in Figs. 2 and 7 the opening 25 is in the forward corner of the pit and the ball carrier 30 is positioned to receive a bowling ball passing through the opening 25 directly without changing the course of travel of the ball. It will be apparent that the ball carrier 30 then lifts the ball in a substantially vertical path which lifts the carrier 30 past the opening 25. Thus should the pinboy inadvertently have his hand or foot extending through the opening 25 into the space between the pits his hand or foot might be caught between the upper edge of the opening 25 and the shoe 31 on the power stroke of the mechanism utilized to lift the ball. Likewise a bowling pin may be bounced into the opening and be caught between the carriage and the upper edge of the opening thus causing damage to the apparatus. These undesirable results are overcome in the embodiment illustrated in Fig. 9 wherein the opening 25a is likewise positioned near the front corner of the pit but the ball carrier 30 is positioned rearwardly of the opening. Normally the pinboy has merely to give the ball a push in the direction of the opening 25a and because of the slope of the pit floor the ball will roll into and through the opening. Guide means 71 in the open space adjacent the alley (or between two adjacent alleys) are provided to guide the ball downwardly and rearwardly to the ball carrier 30. Thus in this embodiment the ball carrier 30 rises in a substantially vertical path with the major portion of the carrier not passing opposite the opening 25a. Even if the pinboy has his hand or foot extending through the opening 25a he will not be injured as the ball carrier rises, since the tongue 31a is the only part of the carrier which projects opposite the opening, and this tongue is quite narrow and is spaced a considerable distance laterally from the opening as seen in Fig. 3.

The gear box 65 will now be described in more detail, reference being had to Figs. 10-13. As illustrated herein the input shaft 64 is rotatably supported in antifriction bearings 103 and 104. Loosely supported on the shaft by means of bushings 105 and 106 is a worm 107. This worm meshes with a worm wheel 108 which is keyed to the output shaft 66 which is rotatably supported in the casing by antifriction bearings 109 and 110 on an axis transverse to that of the shaft 64. The outer end of the shaft 66 carries the crank 67 which is periodically given a single rotation by engagement of a clutch mechanism which comprises a coiled clutch spring 111, a portion of which circumscribes a cylindrical clutch face 112 on an extension 113 on the worm 107, and the remainder of which circumscribes a cylindrical clutch face 114 on an annular bushing 115 which is secured to the shaft 64, as by a key 116. Externally the spring is surrounded in part by an annular member fixed in a bore 118a in the casing 118 of the apparatus, the member 117 being fixed by a key 117a, as shown in Fig. 12. Another part of the spring is surrounded by the tubular member 119 fixed to and rotatable with the worm. One end 120 of the clutch spring 111 is bent radially inward and then turned at right angles to the coil of the spring and anchored in the slot 121 cut in the adjacent portion of the worm (Figs. 10, 11 and 13). The clutch spring 111 is normally coiled so as to wrap around and engage the clutch surfaces 112 and 114 of the worm portion 113 and the bushing 115 respectively, and thereby form a clutch between said parts which causes the worm to rotate with the shaft 64. It is possible to release the clutch by stopping rotation of the opposite end 123 of the clutch spring (Figs. 12 and 13), thus causing the spring to unwind from drive contact with the parts 113 and 115. A braking action for the worm is obtained by the expansion of the spring into engagement with the interior of the parts 117 and 119, due to the inertia of the worm and parts driven thereby.

Generally it is desirable to have the clutch normally disengaged so that the motor 60 may continuously operate. To accomplish this a control arm 124 is secured to a horizontally extending control shaft 125 which is rotatably journalled in the end walls of the casing 118 in bores 126 and 127. The arm 124 has an upwardly extending portion 128 which is normally positioned in the path of the end 123 of the clutch spring to unwrap it from the parts 113 and 115. The control shaft 125 carries a second arm 129 and a coiled spring 130 is connected intermediate the free end of the arm 129 and an adjustable screw device 131 supported in the casing wall to maintain the arm 124 in the position shown in Figs. 11 and 12.

The arm 129 has a projecting portion 132 (Figs. 10 and 11) which is engageable by a cam 133 secured to the worm wheel 108. As best shown in Fig. 13, this cam is generally circular with the exception of a notch at 134 into which the projection 132 extends when the portion 128 of the arm 124 engages the clutch spring end 123 to disengage the clutch.

As the shaft 125 is rocked in a counterclockwise direction as by pulling on the cable of Figs. 1-9, and with the shaft 64 rotating in a counterclockwise direction, the portion 128 of the arm 124 is momentarily withdrawn from its position in front of the end 123 of the clutch spring. Due to its normal tendency to contract, the clutch spring then engages the parts 113 and 115 and drives the worm 107 with the shaft 64. As soon as the worm rotates sufficiently to rotate the cam 133 in a clockwise direction as shown in Fig. 13, sufficiently to move the circular periphery of the cam under the projection 132 of arm 129, the cam 133 serves to maintain the arm portion 128 out of engagement with the end 123 of the clutch spring. The clutch then remains engaged until the crank shaft 66 has completed one revolution, whereupon the projection 132 reenters the notch 134 in the cam 133 and permits the spring 130 to rotate the control shaft 125 in a clockwise direction as shown in Figs. 11 and 12, to position the arm portion 128 in the path of the rotating end 123 of the clutch spring. The end 123 of the spring 111 is therefore stopped the next time it comes around and the clutch spring is released to disengage the clutch after one revolution of the output shaft 66.

I claim:

1. Apparatus for lifting a bowling ball from adjacent the pit floor of a bowling alley to an elevated ball return track, comprising in combination, a vertical trackway, a vertical housing adapted to be mounted adjacent to said pit floor and having said trackway on it, a ball-carrying device having one end of a flexible supporting cable attached to it and mounted for a cycle of movement along said vertical trackway from normally adjacent the pit floor to the track and return and for a slight downward movement from said normal position when a ball rolls thereon, an arm pivotally mounted on said housing and having the other end of said flexible cable secured thereto, a movable series of pulleys and a fixed series of pulleys mounted on said housing through which said flexible cable is reeved, movement of said movable pulleys toward and away from said fixed pulleys providing motion multiplication through said flexible cable to move said ball carrying device through its cycle, a motor on said housing adapted to drive a crank mounted within the housing through a single revolution during each cycle of operation of the lifting apparatus, said crank being not longer than one-half the width of said housing, a second arm having one end connected to said crank and the other end connected to said movable series of pulleys through which said cable is reeved, and a trigger mechanism for effecting movement of said crank by said motor adapted to be engaged by a rod slidably mounted on said housing and held normally out of engagement with said trigger mechanism by a spring, said first arm pivotally mounted on the housing being pivotally connected to one end of said rod, whereby a downward pull on said cable caused by a ball rolling onto said ball carrying device causes said arm to move said rod into engagement with the trigger mechanism for effecting movement of said crank.

2. Apparatus supported in a housing adjacent a pit floor for effecting movement of a bowling ball-carrying device through a cycle from normally adjacent the pit floor to an elevated return track and return, said device being mounted to permit a slight downward movement from its normal position when a ball rolls thereon, comprising in combination, a flexible cable having one end connected to said ball-carrying device and supporting it within said housing, a motor on said housing and means drivingly connected to said motor including a plurality of pulleys through which said flexible cable is reeved providing, upon movement thereof, motion multiplication for lifting said ball-carrying device, means for actuating said motor, comprising: a trigger mechanism for effecting movement of said motion multiplying means by said motor adapted to be engaged by a rod slidably mounted on said housing and held normally out of engagement with said trigger mechanism by a spring, an arm pivotally mounted on said housing and pivotally connected to one end of said rod, said arm having the other end of said flexible cable secured thereto, whereby a downward pull on said cable caused by a ball rolling onto said ball-carrying device causes said arm to move said rod into engagement with the trigger mechanism for effecting operation of said motion multiplying means.

3. Apparatus for lifting a bowling ball from adjacent the pit floor of a bowling alley to an elevated ball return track, comprising in combination, a housing with a vertical trackway therein; a ball-carrying device having a ball holding portion and a chassis portion engaging said trackway, a flexible cable having one end connected to said device for supporting said device; means connected to said cable for moving said device along said trackway from a rest position adjacent the pit floor through a cycle including lifting the ball to said return track and returning the device to its rest position adjacent the pit floor, said device being capable of a slight downward movement from its rest position when a ball rolls thereon, said moving means including a motor; a trigger mechanism for initiating operation of said moving means adapted to be engaged by a rod slidably mounted on said housing and held normally out of engagement with said trigger mechanism by a spring, an arm pivotally mounted on said housing and pivotally connected to one end of said rod, said arm having the other end of said flexible cable secured thereto, whereby a downward pull on said cable caused by a ball rolling onto said ball-carrying device causes said arm to move said rod into engagement with the trigger mechanism to initiate operation of said moving means.

4. Apparatus for lifting a bowling ball from adjacent the pit floor of a bowling alley to an elevated ball return track, comprising in combination, a ball-carrying device having a normal rest position adjacent the pit floor of the alley and mounted for a cycle of movement including elevating of the device to lift the ball to the return track and return to its normal rest position, said device being capable of a slight downward movement from its normal rest position when a ball rolls thereon, cable means for raising and lowering said device and having one end connected to said device, motion multiplying means comprising a plurality of fixed pulleys and a plurality of movable pulleys disposed between the ends of the cable means and through which said cable means is reeved, means including a one-revolution clutch and crank mechanism for moving said movable pulleys toward and away from said fixed pulleys to vary the distance between the ends of the cable means and move said device through its cycle and to hold said movable pulleys against movement at other times, trigger mechanism for initiating operation of said moving means, and means responsive to a pull on the cable caused by a ball rolling onto said device to shift said trigger mechanism and cause operation of said moving means.

References Cited in the file of this patent

UNITED STATES PATENTS

| Number | Name | Date |
| --- | --- | --- |
| 650,691 | Railton et al. | May 29, 1900 |
| 724,504 | Rice | Apr. 7, 1903 |
| 1,068,131 | Holland | July 22, 1913 |
| 1,188,760 | Hagenbucher | June 27, 1916 |
| 1,263,875 | Fekete | Apr. 23, 1918 |
| 1,431,695 | Severence | Oct. 10, 1922 |
| 2,326,554 | Nall | Aug. 10, 1943 |
| 2,348,540 | Hedenskoog | May 9, 1944 |